United States Patent [19]

Marchetto et al.

[11] Patent Number: 4,974,765
[45] Date of Patent: Dec. 4, 1990

[54] CONTAINER WITH A SUCTION-CUT ATTACHMENT PARTICULARLY FOR MOTORCYCLES

[75] Inventors: Giuseppe Marchetto; Carlo Marchetto, both of Trissino; Francesco Marchetto, Arzignano, all of Italy

[73] Assignee: Clover SRL, Trissino, Italy

[21] Appl. No.: 288,243

[22] Filed: Dec. 22, 1988

[30] Foreign Application Priority Data

Dec. 22, 1987 [IT] Italy ................ 85648 A/87

[51] Int. Cl.$^5$ ............................................. B62J 7/02
[52] U.S. Cl. .................... 224/275; 224/282; 224/42.42; 224/42.11; 224/32 R; 280/289 A
[58] Field of Search ............ 224/273, 275, 282, 42.01, 224/42.11, 42.42, 0.5, 32 R, 35, 31; 280/289 A

[56] References Cited

U.S. PATENT DOCUMENTS

| | | | |
|---|---|---|---|
| 2,123,549 | 7/1938 | Williams | 248/553 |
| 2,771,231 | 11/1956 | Hare | 224/330 |
| 3,944,924 | 3/1976 | Miyachi | 455/89 |
| 4,059,207 | 11/1977 | Jackson et al. | 224/31 |
| 4,068,859 | 1/1978 | Dihman | 224/32 R |
| 4,325,531 | 4/1982 | Omholt | 248/363 |
| 4,359,233 | 11/1982 | Jackson et al. | 280/289 A |
| 4,750,658 | 6/1988 | Jennings | 224/275 |

FOREIGN PATENT DOCUMENTS

| | | | |
|---|---|---|---|
| 860463 | 12/1952 | Fed. Rep. of Germany | |
| 3125460 | 1/1983 | Fed. Rep. of Germany | 224/35 |
| 3505703 | 10/1985 | Fed. Rep. of Germany | 224/273 |
| 1080003 | 12/1954 | France | |
| 502494 | 9/1936 | Switzerland | |

OTHER PUBLICATIONS

"Eclipse Tank Bag", Product Evaluation, *Cycle Magazine*, Jan. 1975.

*Primary Examiner*—Ernest G. Cusick
*Attorney, Agent, or Firm*—Birch, Stewart, Kolasch & Birch

[57] ABSTRACT

A container is disclosed which is particularly well suited for anchoring to a motorcycle, the container includes: a box provided with a lid, a first bottom and a second bottom; the second bottom hingeably connected to said box; the second bottom having a plurality of openings therein for the connecting of suction cups thereto, having suction cups connected thereto for anchoring the container to the motorcycle.

6 Claims, 2 Drawing Sheets

CONTAINER WITH A SUCTION-CUT ATTACHMENT PARTICULARLY FOR MOTORCYCLES

FIELD OF THE INVENTION

The invention concerns a container with a suction-cup attachment, particularly suited for motorcycles.

BACKGROUND OF THE INVENTION

The need to provide motorcycles with one or more permanently attached carrier devices has been felt since motorcycles have first been manufactured.

Years ago manufactures used to provide motorcycles with carriers consisting essentially of flat stands connected with the body of the motorcycle by belts/or elastic bands on which suitcases, boxes or bags of any type could be strapped with belts or elastic bands, too.

Another type of carrier device consists of rigid containers made of plastic in the shape of a box or of a suitcase which are also attached to flat stands described before which are usually positioned behind the seat.

Evolution in motorcycle-design which has occurred in the last few years has led to the construction of motorcycles with one-piece seats, and has changed the position of the motorcyclist's upper body leaning forward toward the motorcycle, so that the rear-end of his body is set back toward the rear-end of the motorcycle. This fact has led to the consequence of reducing and, in some cases, of completely doing away with the space available for the connection of containers on the motorcycles.

Since motorcycles have felt the need to have available, nonetheless, a container, in many models said container has found its support area on the fuel tank of the motorcycle.

Said containers, which usually acquire the shape of a bag or suitcase, are anchored to the motorcycle or to the fuel tank by means of bands which may be or not be elastic, but which are, however, always adjustable and which are wound around the fuel tank and then anchored to the tube holding the steering shaft of the motorcycle.

A further evolution in the design of motorcycles has provided the motorcycle with on outer shell encasing fuel tank, so that it is extremely difficult, if not impossible, to wound belts or bands around the fuel tank and, therefore, to attach a container to the motorcycle.

SUMMARY OF THE INVENTION

The purpose of the present invention is that of overcoming drawbacks such as difficulties or impossibilities encountered in attaching a container to the fuel tank of a motorcycle or to parts thereof which are encased.

Another proposed purpose which the invention intends to fulfil is that of making available a container which can be attached to the body of a motorcycle, without any need for making holes in or for providing fixed fastenings on the motorcycle body or, at any rate, without causing the container to leave visible marks on the varnish of the body.

Another purpose is that of obtaining a container which is extremely easy to apply on and remove from the body of a motorcycle and also securely attachable to the body, so that it is not possible for the container to come off while the motorcycle is moving.

All the above-mentioned purposes, and others which will be better described hereafter, are fulfilled with the construction of a container for motorcycles which, in accordance with the claims, includes a box-shaped space provided with a lid and at least with a bottom, characterized in that one or more suction cups, adhering to the body of the motorcycle, are connected with the outer bottom, single or double, of said container, in order to ensure a stable anchorage between the container and the motorcycle body.

According to one embodiment of execution of the invention, the suction cups of the container are attached to a flat board made of a flexible plastic material, so that it can adapt itself to the surface of the fuel tank to which the suction cups adhere; in this case, the board carrying the suction cups is the outer bottom of the container and it is connected removably on one side with the container, by means of hinges, belts or similar means.

According to another embodiment of execution of the invention, the container has a single bottom, which may be or not be rigid, at which one or more suction cups may be directly applied and which adhere to the surface of the fuel tank or to a part of the motorcycle body suited to receive the container.

In this case is also useful to expect that the suction cups are set on some tongues which are on the bottom, but outside the container, so that the connection and the detachment of the suction cups to the motorcycle body is possible when the container is closed as well.

In the executions of the invention wherein suction cups are used, the container has some slots of any shape or a plurality of holes where the suction cups are fitted in order to make the placing of the suction cups possible in the most suitable parts of the motorcycle body.

Other characteristics and details of the invention will be better described in the above-mentioned forms of execution, which are given by way of example only, but are not meant to limit the scope of the invention.

DETAILED DESCRIPTION OF THE INVENTION

Figure 1:
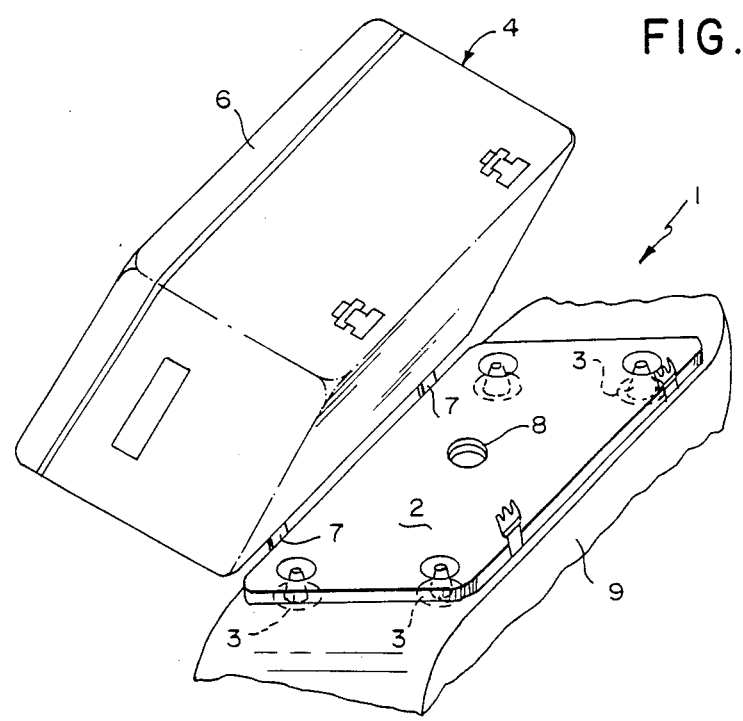
FIG. 1 represents a container according to the invention, provided with a double bottom and with the suction cups on its outer bottom.

With reference to FIG. 1, it can be observed that the container, indicated as a whole with 1, consists of a box 4 with a bottom 5 and a lid 6, and of a supporting board 2 that is the outer bottom of the box which is made of a composite flexible plastic material which, in this case, is made of a sheet of flexible plastic material with an underlying layer of synthetic expanded rubber. The suction cups 3 are arranged at the corners of a quadrilateral and they are permanently attached to bottom 2 by known means.

The adherence of the suction cups to the body of the motorcycle is obtained by means of an excentric clamping or by screwing in the known ways.

In the case of FIG. 1, the box 4 is connected by means of a hinge 7 to the flexible plastic bottom 2, so that it can easily be latched or partially or totally unlatched from said flexible plastic bottom.

For instance, should the container 1 be fastened on the fuel tank of the motorcycle, it is obvious that, in case of refueling, it is particularly useful to have the possibility of tilting the box 4 so as to have access to cap of the fuel tank 9 which protrudes from hole 8 made in the flexible plate bottom 2, in order to avoid having to remove the box 4 from the motorcycle.

Figure 2:
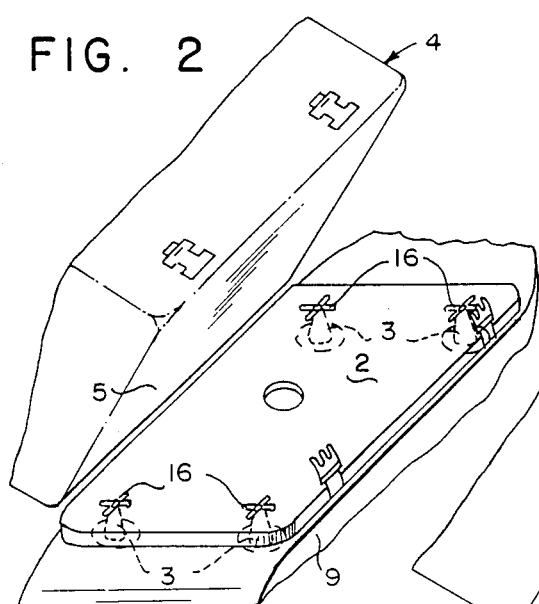
FIG. 2 shows a variation of the container of FIG. 1, in which the outer bottom has some slots to adjust the distance between the suction cups.

FIG. 2 shows a variation concerning the flexible plastic bottom 2 of the container, wherein there is a possibility of changing the geometrical arrangement of the suction cups 3 within the slits 16 having cross shaped cuts made in the place of fixed holes receiving the suction cups. This solution is particularly advantageous when the same container 1 is applied on different motorcycle models. It is in fact obvious that the adjustable arrangement of the suction cups 3 within the slits 16 allows the container 1 of FIG. 2 to adapt itself with its bottom to different motorcycle bodies or to different types of motorcycle fuel tanks.

Figure 3:
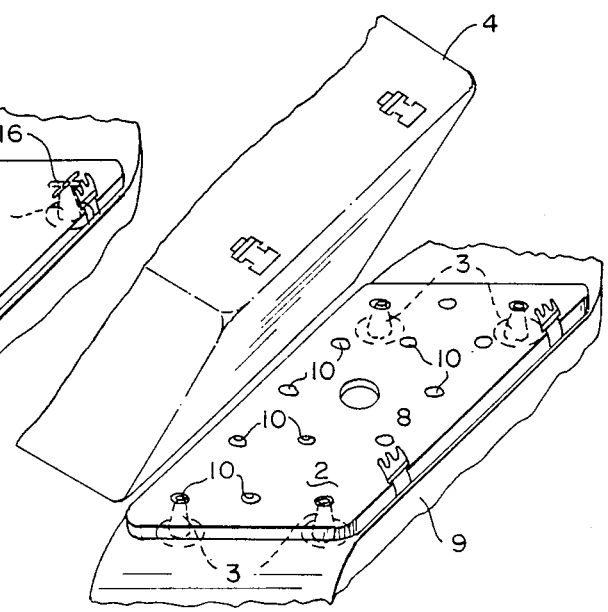
FIG. 3 represents a variation of the inventive container in FIG. 1 wherein the outer bottom has plurality of holes to adjust the distance between the suction cups.

FIG. 3 shows another variation concerning the flexible plastic bottom 2 connected with tank 4. In said variation, flexible plastic bottom 2 has a plurality of holes 10 able to fit the suction cups 3.

In this way the suction cups 3 can be placed in the most advantageous way according to the shape and dimension of the tank, to which the container 1 must be connected.

In FIG. 3 the four suction cups 3 are placed on the four corners of the flexible plastic 2, but if the tank 9 were shorter e.g. in length, a couple of suction cups could be put closer to the other one.

Figure 4:
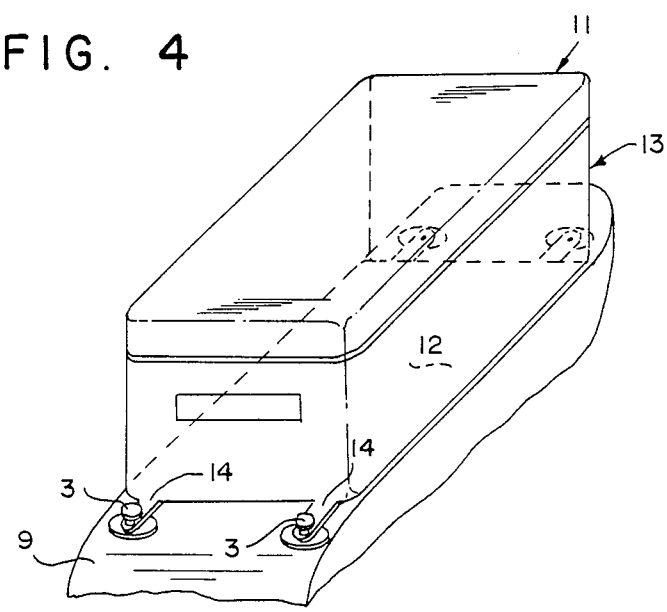
FIG. 4 is yet another variation of the container with a single bottom having tongues outside the container and where the tongues support the suction cups.

FIG. 4 shows a more economical solution of the container 11 according to the invention, obtained by applying directly at the bottom 12 of a box 13 the suction cups 3. Thus the lower cost of the container 11 in relation to the container 1 becomes obvious, since here outer flexible bottom 2 is missing.

In order to avoid making the applying and removal of suction cups to a motorcycle body become too difficult or impractical, FIG. 4 shows a variation according to which four tongues 14 are placed outer to the bottom 12 of the container 11, so that the applying and the removing of suction cups 3 become easy, it even being possible when the lid of container 11 is closed as well.

In the case of FIG. 4 tongues 14 are made of plastic and form a unique part with bottom 12.

Figure 5:
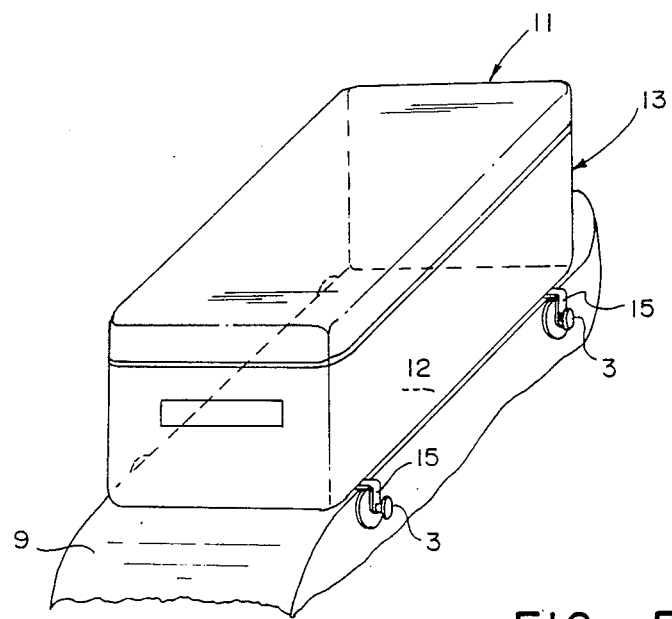
FIG. 5 shows a variation of the container of FIG. 4, wherein the tongues are bended on the side of the fuel tank of the motorcycle.

Moreover said tongues 14 are semi-rigid and are placed in the longitudinal direction of container 11. FIG. 5 shows the same container 11 provided with a unique bottom 12, but the tongue 15 are placed transversally as regards the longitudinal direction of the container and are bended on the vertical wall of tank 9.

In this case tongues are made flexible and pliable (made capable with the choice of a suited material), so that they can be adapted to the various shapes of motorcycle tanks. It has then been demonstrated that the container according to the present invention, in each of its different forms of execution, solves all problems connected with the secure attachment between the container and the motorcycle body without any need for said body to be drilled with holes for the passage of belts or similar devices. It will also be pointed out that a container which is obtained by means of the suction cups prevents all possible deterioration of the body varnish in correspondence with the points of adherence, both thanks to the material used in manufacturing the suction cups, which is notably a flexible plastic material, and because the suction cups in and of themselves do not allow friction movements between the suction cups and the element to which the suction cup adheres.

As far as the reliability of clamping and adherence between the container of the invention and the motorcycle body is concerned, it will be pointed out that tests performed on prototypes employing four suction cups with a holding strength of approx. 20 kg. each have given very good holding results even while a motorcycle was moving under vibrating and bouncing conditions.

It will also be pointed out that the container 1, and 11 may also be made with a single suction cup, whatever its shape, rather than with a plurality of suction cups, provided, however, said single suction cup ensures a necessary clamping strength. Moreover the suction cups may by secured to the surface to which they adhere using different known means, such as the toggle clamping method, the screw clamping method, the eccentric clamping method or also the simple method of clamping a single suction cup without any specific pressure means.

We claim:

1. A container particularly for anchoring to a motorcycle, which comprises:
    a box provided with a lid, a first bottom and a second bottom;
    said second bottom connected to said box with hinged means;
    said second bottom having a plurality of means therein for the connecting of suction cups thereto; and
    said second bottom having suction cups connected thereto for anchoring said container to said motorcycle.

2. The container of claim 1, wherein the plurality of means of said second bottom is a series of holes.

3. The container of claim 2, wherein the plurality of means is a series of slits.

4. The container of claim 1, wherein a latching means exists between said box and said second bottom.

5. The container of claim 1, wherein said second bottom has a hole therein for providing access to a fuel tank cap on said motorcycle.

6. The container of claim 1, wherein said second bottom is made of a flexible plastic material.

* * * * *